Jan. 11, 1966   W. T. MADEIRA   3,228,101
SNAP RING TOOL
Filed Aug. 29, 1963   2 Sheets-Sheet 2

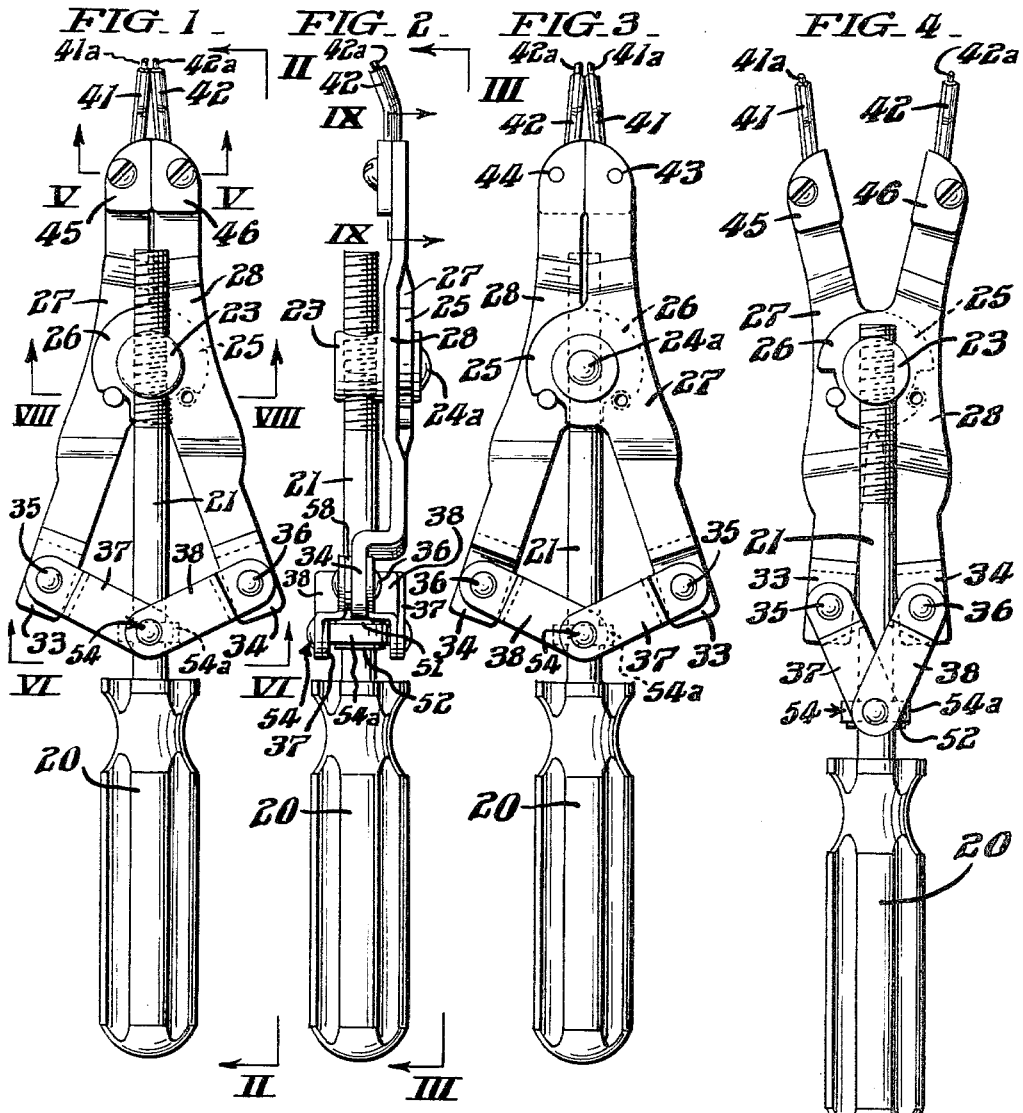
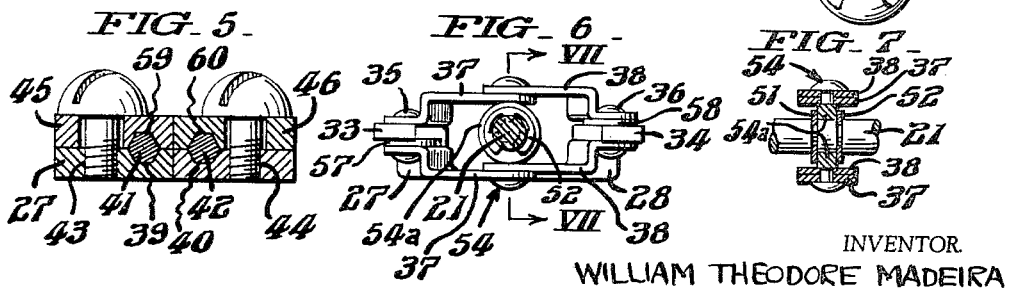
INVENTOR.
WILLIAM THEODORE MADEIRA
BY
Paul & Paul

INVENTOR.
WILLIAM THEODORE MADEIRA
BY
Paul & Paul

United States Patent Office 3,228,101
Patented Jan. 11, 1966

3,228,101
SNAP RING TOOL
William Theodore Madeira, Lancaster, Pa., assignor to K-D Manufacturing Company, Lancaster, Pa., a corporation of Pennsylvania
Filed Aug. 29, 1963, Ser. No. 305,253
3 Claims. (Cl. 29—229)

This invention relates to a tool particularly adapted for handling snap rings.

As is well known, snap rings are open-ended retaining rings, and may be for either external or internal use. If for external use, the rings are tensioned against spreading. If for internal use, the rings are tensioned against contraction.

To facilitate handling of the rings, i.e. to facilitate spreading external snap rings or contracting internal snap rings, the open ends of the rings are ordinarily provided with ears having holes therethrough for receiving the nose points of snap ring plyers or other tool.

The principal object of the present invention is to provide a universal snap ring tool suitable for use with either internal or external snap rings and adapted for use with rings of different sizes.

The invention will be clear from a consideration of the following specification taken together with the drawing in which:

FIG. 1 is a plan view showing the tool of the present invention in fully closed position;

FIG. 2 is a side view of the tool looking along the line II—II of FIG. 1;

FIG. 3 is a plan view of the other side of the tool of FIG. 1;

FIG. 4 is a plan view showing the tool in fully open position;

FIG. 5 is a view, in section, of the jaws looking along the line V—V of FIG. 1;

FIG. 6 is a view, in section, of the lever links looking along the line VI—VI of FIG. 1;

FIG. 7 is a view, in section, showing the trunnion for the lever links as seen looking along the line VII—VII of FIG. 6;

Figure 8:
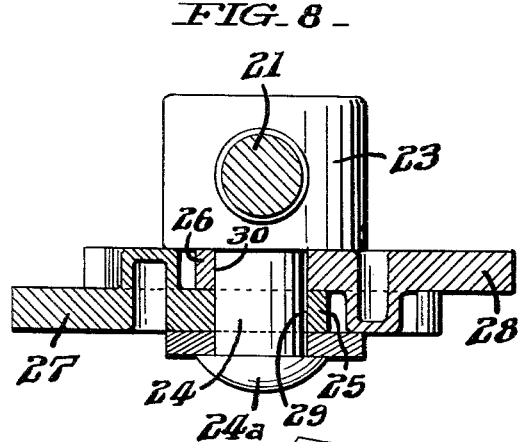
FIG. 8 is a view, in section, of the nut looking along the line VIII—VIII of FIG. 1.
Figure 9:
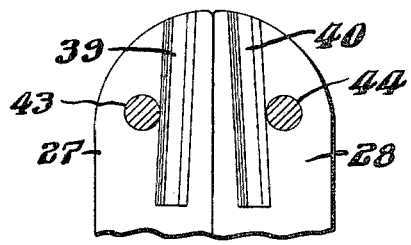
FIG. 9 is a view, in section, of the jaw plates looking along the line IX—IX of FIG. 2.

Referring now to the drawings, the tool of the present invention is shown to have a handle 20, which may preferably be hard plastic, to which is affixed a cylindrical rod or shank 21 which is externally threaded at the outer portion.

Mounted on the threaded portion of shank 21 is a nut 23 of generally cylindrical form having a transverse bore internally threaded for receiving the threaded portion of shank 21, as seen in FIGS. 2 and 4, and as seen in the enlarged view of FIG. 8. Nut 23 is provided with an integral stud rivet 24 for securing to the nut 23 the lever arms 27 and 28. For this purpose, the lever arms 27 and 28 are provided with bosses 25 and 26, respectively, having therein holes 29 and 30 through which the stud 24 passes. After the lever arms 27, 28 are inserted onto the stud 24, the exposed end of the stud is hammered down forming the head 24a, seen clearly in FIG. 8.

Figure 10:
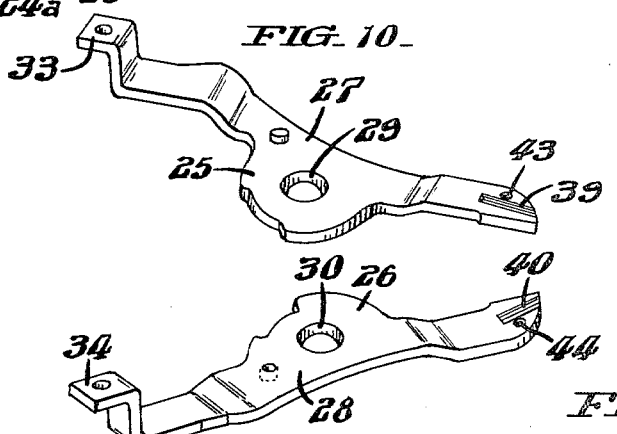
FIG. 10 is a perspective illustration of lever arms.

As best seen in FIGS. 2 and 10, the rearward ends of the lever arms 27 and 28 are provided with an offset portion, 33 and 34, respectively, having a hole therethrough for receiving the rivet 35 and 36, respectively, by means of which lever links 37 and 38 are pivotally secured to the rearward ends of the lever arms 27 and 28.

The forward or jaw ends of the lever arms 27, 28 are provided with a slot or groove, 39 and 40, respectively, and with a tapped hole, 43 and 44, respectively, for receiving a jaw-plate screw by means of which the jaw plates 45 and 46 are secured to the forward or jaw ends of the lever arms. The jaw plates 45 and 46 are provided, as best seen in FIG. 5, with corresponding grooves 59 and 60 which are coaxially aligned and coextensive with the grooves 39 and 40 in the jaw end of the lever arms so that, when the jaw plates are secured to the forward end of the lever arms, a socket is provided for receiving the shaft or shank of the points 41 and 42. The grooves 39, 40, 59 and 60 are flat sided forming hexagonal sockets for receiving the flat sided hexagonal shanks of the points 41 and 42. The use of flat sided, preferably hexagonal, sockets and flat sided, preferably hexagonal, shanks for the points provides increased resistance to radial displacement and prevents turning of the points during spreading or contracting of the snap ring.

Each of the points 41, 42 is provided with a tip 41a, 42a of circular cross section which is preferably reverse-tapered, the largest diameter being at the extremity of the tip and the smallest diameter being at the junction of the tip and the shank, thereby forming shoulders. Points with different size tips are available for use with different size apertures in the ears of the different size snap rings to be handled. The employment of a reverse-tapered or frusto-conical tip of proper size is advantageous in that it improves the ability of the tip to remain in the hole in the snap ring during spreading or contracting, as is described in Kulp Patent 3,040,420, granted June 26, 1962, and assigned to K-D Manufacturing Company, Lancaster, Pa., the assignee of the present application.

Referring now to the manner in which the lever links 37 and 38 are connected to the shaft 21, the nonthreaded portion of the shaft is provided, at a location just above the handle 20, with a pair of annular grooves for receiving a pair of spaced-apart retaining rings 51 and 52 for retaining therebetween the trunnion bearing 54. Trunnion bearing 54 is in the form of a collar 54a mounted rotatably on shaft 21 and having protruding therefrom a pair of opposed rivet studs for receiving the apertured ends of the lever links 37 and 38, as seen clearly in FIGS. 2 and 6. After the lever links 37, 38 are placed on the studs of the collar 54a, the exposed ends of the studs are spread, as by hammering, thereby pivotally securing the links 37 and 38 to the collar of the trunnion bearing.

Referring again to the lever arms 27 and 28, the bosses 25, 26 are, of course, placed on the rivet stud 24 of the nut 23 in overlapping position, as seen clearly in the side elevational view of FIG. 2. The lever arms 27 and 28 are so shaped that, while the boss portions are in overlapping position on the stud 24, a jaw ends are in the same plane and meet in abutting relation. Similarly the rearward ends of the lever arms 27 and 28 are in the same plane. To compensate for the overlapping position of the lever links 37 and 38 on the rivet studs of trunnion 54, a spacer 57 and 58 is employed at each of the other ends of the lever links, on the rivets 35 and 36, as seen in FIGS. 2 and 6.

In operation, it will be seen that by rotating the handle 20 to rotate the shaft 21 in one direction or the other, the nut 23 is caused to move axially along the threaded portion of the shaft, either outward or inward, thereby either increasing or decreasing the distance between the nut 23 and the axially-fixed trunnion bearing 54. Increasing the spacing between the nut 23 and the trunnion bearing 54 causes the rearward or link ends of the lever arms 27 and 28 to converge or come together and causes the forward or jaw end of the lever arms to diverge. Conversely, decreasing the distance between the nut 23 and the trunnion bearing 54 causes the link ends of the lever arms to diverge and the forward or jaw ends to converge.

Figure 11:
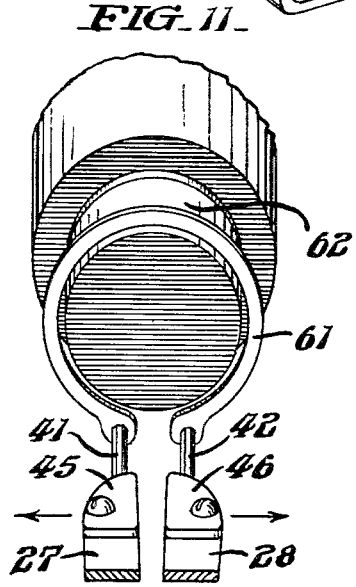
FIG. 11 is a perspective view illustrating the use of the tool with an external type of snap ring.
Figure 12:
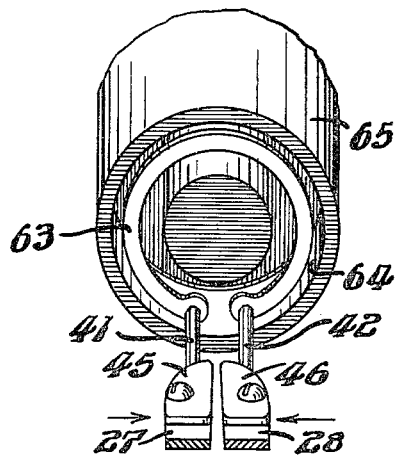
FIG. 12 is a perspective view illustrating the use of the tool with an internal type of snap ring.

The manner in which the tool is used to spread an external snap ring 61 for sliding over a shaft 62 is illustrated in FIG. 11, while FIG. 12 depicts the manner in which the tool is used to contract an internal snap ring 63 for inserting into the bore 64 of a shaft 65.

It will be understood that the tool has good mechanical advantage which makes it possible with relatively little force to spread open an external snap ring, or to contract an internal snap ring, by merely turning the handle in one direction or the other. At the same time, the tool offers very high resistance against the points being moved from their spread or contracted position, by any force imposed upon the points by the snap ring itself in its effort to return to its normal condition.

While the preferred embodiment of this invention has been described in some detail, it will be obvious to one skilled in the art that various modifications may be made without departing from the invention as hereinafter claimed. For example, in the illustrated embodiment, the lever arms 27 and 28 are shown to be curved and mounted on the nut stud 24 in back-to-back arcuate relation so that when the shaft 21 is rotated in a direction to move the nut 23 forwardly to increase the distance between the said nut 23 and the trunnion bearing 54, the rearward ends of the lever arms converge and the forward or jaw ends diverge.

It is apparent, however, that the lever arms could be relatively straight arms, as viewed in plan view, centrally mounted on the nut stud to cross at the location of the nut. In such alternate embodiment, when the handle 20 is turned in a direction to move the nut 23 forwardly to increase the distance between the nut and the trunnion bearing 54, the forward or jaw ends of the lever arms, as well as the rearward ends, would converge.

What is claimed is:

1. For use with snap rings having apertured ears at the open ends, a universal tool adapted for use with either external or internal snap rings, said tool comprising: a handle, an elongated cylindrical shaft fixed to said handle and extending forwardly therefrom, the forward end of said shaft being threaded externally; a nut on the threaded portion of said shaft, said nut having a stud extending therefrom in a direction transverse to the axis of said shaft; a pair of opposing lever arms each having an intermediate aperture for pivotally mounting said levers on said stud; a collar mounted on said shaft above the handle and rotatable relative to said shaft; means restraining axial movement of said collar relative to said shaft; a pair of links each having one end pivotally secured to the rearward end of one of said lever arms and the other end pivotally secured to said collar; and opposing jaws at the forward end of said lever arm, each jaw being provided with a point having an elongated shank terminating at the forward end in a tip having a cross section smaller than the cross section of said shank.

2. A tool according to claim 1 characterized in that said collar is a trunnion bearing.

3. A tool according to claim 2 characterized in that said lever arms are generally arcuate and pivotally mounted on said nut stud in back-to-back arcuate relation such that when said shaft is rotated in a direction to move said nut forwardly to increase the distance between said nut and the axially-fixed trunnion bearing, the rearward ends of said lever arms converge and the forward ends diverge.

References Cited by the Examiner

FOREIGN PATENTS 931,504  7/1963  Great Britain.

WILLIAM FELDMAN, *Primary Examiner.*